2,890,814
Patented June 16, 1959

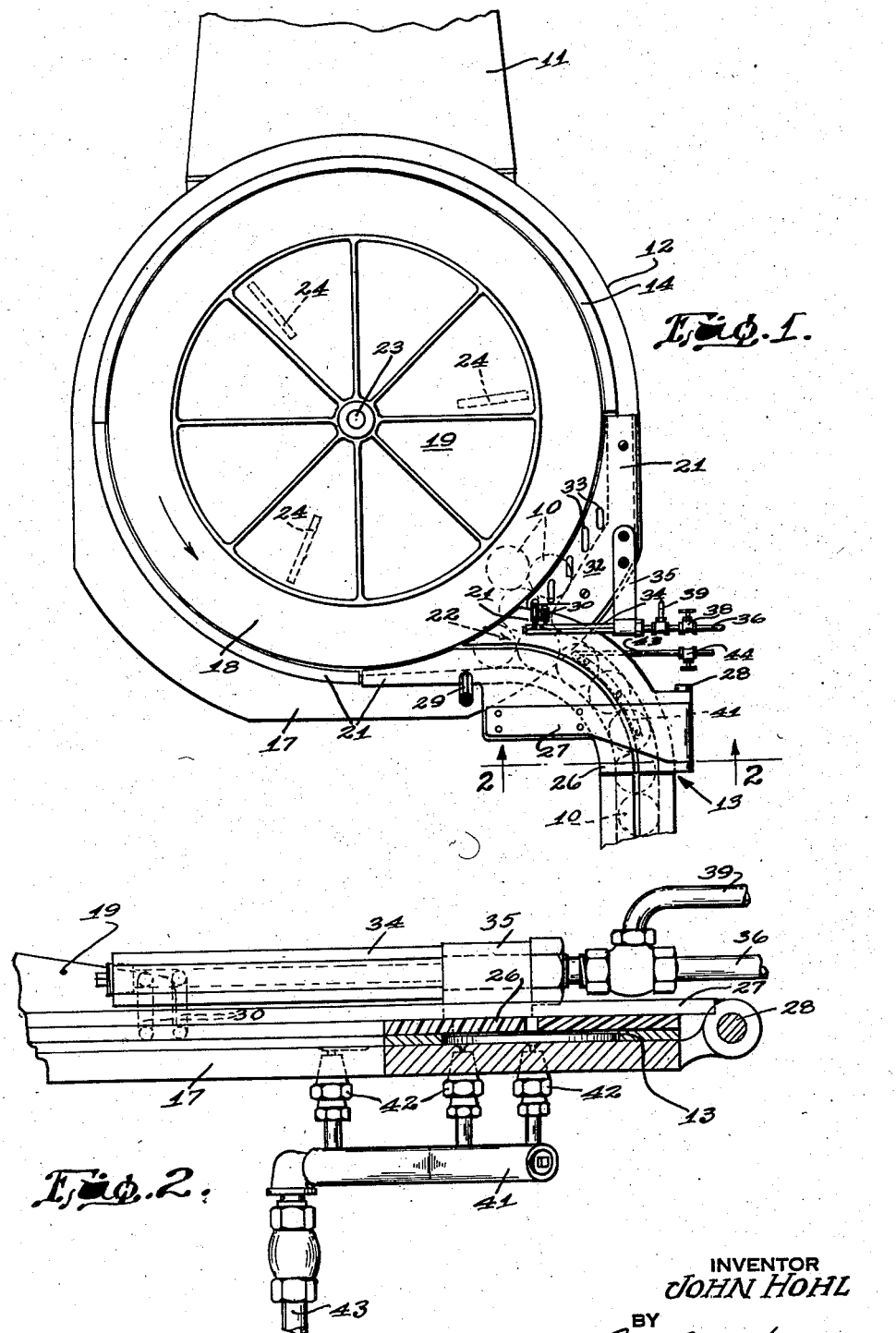

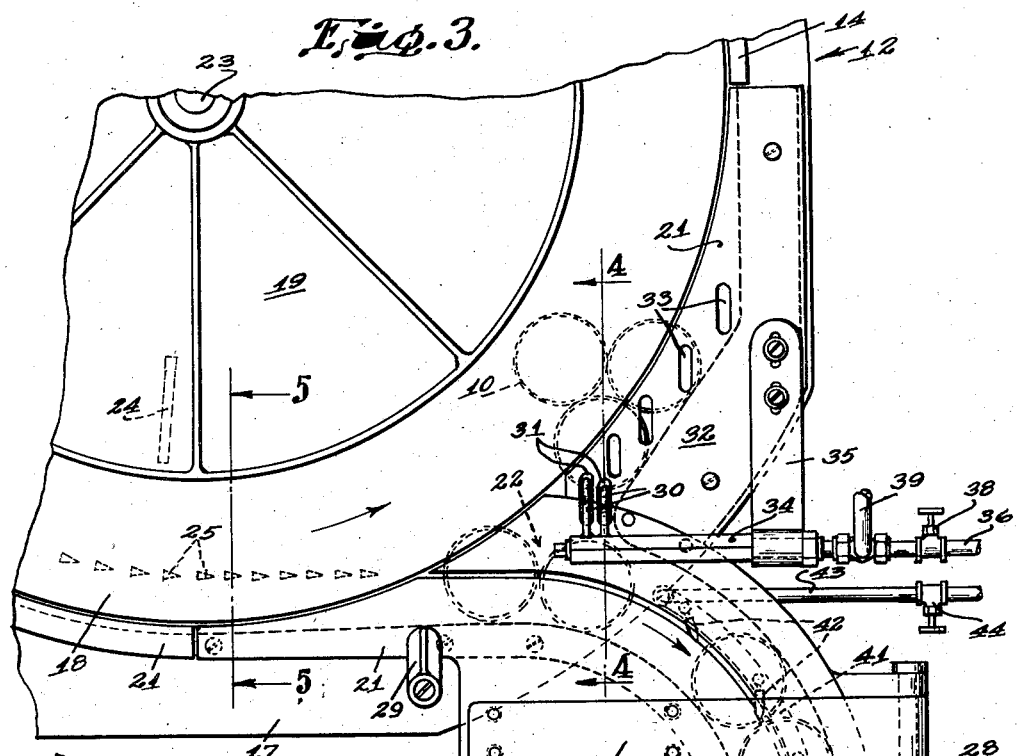

2,890,814
FEEDER FOR CLOSURE CAP SEALING GASKETS

John Hohl, Toledo, Ohio, assignor to Owens-Illinois Glass Company, a corporation of Ohio Application May 24, 1957, Serial No. 661,340

5 Claims. (Cl. 221—175)

My invention relates to closure cap sealing gasket feeders and more particularly to apparatus for hoppering ring-type sealing gaskets and delivering them rapidly in succession to a machine which assembles them with closure cap shells.

In that form of gasket feeder to which my invention especially pertains, the gaskets are deposited in random fashion in a reservoir from which they flow by gravity to a hopper. In this hopper, the gaskets are tumbled or agitated continuously and discharged therefrom in succession through a lower side outlet into a conduit, the latter leading to a conventional closure cap shell and sealing gasket assembling machine, such for example as that shown in patent to J. Belada No. 2,567,094, issued September 4, 1951. This side outlet opens both horizontally and upwardly into the hopper chamber and as a consequence free on edge rolling discharge of gaskets therethrough frequently may be obstructed by reason of an accumulation of gaskets immediately above the outlet. Such results in downward pressure of the mass upon those gaskets in, or about to enter the outlet and consequent serious retardation, if not actual complete stoppage of the flow of gaskets through the outlet. Such conditions cannot be tolerated in a high speed automatic assembly operation wherein interrupted rapid flow of both gaskets and cap shells to the assembling machine very obviously is absolutely essential.

An object of the present invention is to overcome the above noted objections through the introduction of air under pressure into the gasket hopper in such fashion that normally those gaskets which are not about to be discharged will positively be moved to positions in which they cannot interfere with other gaskets moving to or through the discharge outlet.

A further object of my invention is the provision of means of the above character in which normally the pressure of the introduced air is only sufficient to move a few gaskets at a time upwardly away from the discharge outlet but wherein there is also included manually operable means for materially increasing the pressure of the introduced air in the event of abnormal jamming conditions.

It is also an object of my invention to provide means for introducing jets of air under pressure into a conduit which receives gaskets from the hopper chamber and guides them to a closure cap shell and gasket assembling machine, whereby to insure both rapid continuous movement of gaskets through said conduit and lessen the likelihood of "gasket jamming" in this conduit.

A further object of my invention is the provision of air injecting nozzles for both the hopper reservoir and the conduit leading to the assembling machine, utilizing pressure reducing valves to maintain the air pressure at the point required for normal operating conditions and incorporating in the system a valved air line which by-passes the pressure reducing valves and is usable to greatly increase the pressure of air flowing through the nozzle when such is required.

Other objects will be in part apparent and in part pointed out hereinafter.

In the drawings:

Fig. 1 is a front elevational view showing my invention incorporated in a rotary hopper-type gasket feeder.

Fig. 2 is a sectional elevational view taken substantially along the line 2—2 of Fig. 1.

Fig. 3 is a fragmentary front elevational view showing my invention on an enlarged scale.

Fig. 4 is a sectional view taken substantially along the line 4—4 of Fig. 3.

Fig. 5 is a transverse sectional view taken substantially along the line 5—5 of Fig. 3.

Fig. 6 is a piping diagram showing the supply lines to the nozzles and valved air lines which by-pass the pressure reducing valves.

In the illustrated embodiment of my invention, it is incorporated in apparatus utilizing the general principle of the closure cap feeder shown in patent to J. A. Johnson, No. 2,124,618, issued July 26, 1938, the structure having been redesigned to adapt it to the handling and feeding of rubber sealing gaskets of the type widely used in closure caps for bottles, jars and the like containers.

In the present apparatus, the sealing gaskets 10 initially are deposited in a reservoir 11 from which they flow by gravity to a hopper 12. In this hopper the gaskets are tumbled and handled in such fashion that they are discharged therefrom one at a time into a conduit 13 which in turn functions to direct the gaskets to an assembling machine, such, for example, as that shown in the Belada patent referred to above. The hopper 12 comprises a casing 14 including a floor 15 which is declined toward a horizontal discharge opening 16, the lower half of which is of hemicylindrical form as is the immediately adjacent portion of the floor 15. Extending about at least a portion of the opening 16 (Fig. 5) in a radially outward direction is a flange 17 which cooperates with the marginal portion 18 of a rotary disk 19 in providing a narrow channel-like guideway 20 along the lower segment of the hopper to receive the sealing gaskets 10 and support them in on-edge positions preparatory to discharging them into the conduit 13. Arcuate strips 21 formed in sections and secured to the flange 17 function to close one margin of the gasket guideway 20 so as to retain the gaskets in proper position for movement to the outlet 22 at the receiving end of the conduit 13. These strips 21, as shown in Figs. 1 and 3 may well be formed in several sections for obvious reasons. The rotary disk is mounted for rotation on a horizontal shaft 23, the axis of which inicdentally is the center about which the hemicylindrical discharge opening and adjacent floor section are formed. On the interior surface of the rotary disk there are several fingers 24 which aid in tumbling the gaskets to insure continuous feeding of these articles to the end that at all times there will be several arranged on edge in succession in the aforementioned guideway 20 adjacent the lower margin of the discharge opening 16. To assist in advancing the gaskets and cause them to roll along the guideway 20 to the discharge outlet 22 I have provided a plurality of air nozzles 25 which may be of conventional form and operate to direct streams of air under pressure toward said outlet 22 and thereby insure movement of the gaskets in succession to the latter. As a matter of convenience, one of the sections of the strips 21 is formed integral with a section of the conduit cover 26 which is mounted upon a hinged carrier 27, the latter being supported on a vertical hinge pin 28. A clamp 29 functions to releasably secure these elements in operating position. Thus the conduit and lower part of the hopper may be opened whenever necessary. The foregoing in general describes conventional cap and gasket feeders used in the trade today.

As shown in Figs. 1 and 2, the gasket outlet 22 in part opens upwardly into the hopper and it is in this area that the sealing gaskets frequently tend to pile up and create a mass of such weight that those gaskets entering or about to enter the outlet 22 are subjected to this downward pressure and as a consequence are unable to move through the outlet to the conduit 13. Those gaskets in or at the entrance to the outlet actually are flattened or otherwise distorted and crowded together to such an extent that they simply cannot move at all, much less into the outlet. The prime purpose of the present invention is twofold; in the first place, it is intended to prevent the creation of the described condition, and in the second place, to provide simple effective means for quickly correcting that condition should it develop under very abnormal circumstances.

My invention provides for the introduction of air under pressure into the hopper at a point immediately above the gasket outlet 22 and directing the air in a generally upward direction (Figs. 3 and 4) so that gaskets or like articles moving into positions in the path of the stream of air under pressure are quickly moved upwardly and back into the hopper, thereby leaving those gaskets entering and in proximity to the outlet, free to advance under the influence of the propelling action of the rotary disk 19 and air introduced through the nozzles 25 referred to heretofore. Although the number of nozzles 30 employed in moving gaskets upwardly away from the outlet 22 may vary in number, I have shown two which project into a pair of vertical slots 31 formed in a cover plate 32 which carries one of the aforementioned arcuate strips 21. Above these openings 31, into which the nozzles 30 project, are several vent openings 33 which are disposed along the upper strip 21 and function to permit the escape of air to the atmosphere. Such venting is essential to effective functioning of the invention in that it permits the necessary movement of air currents in the desired zone rather than the mere building up of pressure in that area. The two nozzles 30 are connected to a manifold 34 which is mounted on a suitable bracket 35 and connected to a pipe line 36 leading to a source of supply of air under pressure (not shown) by way of a supply pipe 37. An adjustable pressure reducing valve 38 is provided in said pipe line 36. An air line 39 (Figs. 3 and 6) provided with a control valve 40 by-passes the pressure reducing valve 38 and is operable, at will, to supply air under full line-pressure to the nozzles 30 in the event conditions develop which require the use of higher pressure momentarily to break up an accumulated mass of gaskets.

For the purpose of supplementing other propelling forces in moving gaskets through the conduit 13, I arrange alongside the longitudinal center line of a portion of the conduit 13, a manifold 41 formed with a plurality of nozzles 42 which direct streams of air under pressure into the guideway of the conduit 13 in a direction generally away from the aforementioned outlet 22. This manifold 41 is connected to a pipe line 43 having a pressure reducing valve 44 therein and leading to the aforementioned air supply pipe 37.

With the structure described above, it is apparent that under normal operating conditions and with air being directed into the hopper through said nozzles 30 (Figs. 3 and 4) accumulation of gaskets in sufficient number immediately over the outlet 22 to interfere with normal discharge of gaskets through said outlet is rather consistently avoided. Thus those gaskets rolling in the guideway 20 toward the outlet 22 are relieved of any such downward pressure upon them by other gaskets as would interfere with their normal discharge into the conduit 13. As is also apparent, the air nozzles 42 insure the desired movement of the sealing gaskets through the conduit 13 to the point at which they are to be assembled with closure cap shells. If perchance circumstances develop which cause abnormal accumulation of gaskets immediately over the outlet 22, the operator opens the valve 40 and this immediately admits air under full line-pressure to all of the nozzles 30, with the result that any gaskets interfering with movement of other gaskets into or through the outlet 22 are forcibly and quickly moved upwardly into the hopper so that the remaining gaskets again are free to enter or move through the outlet.

Modifications may be resorted to within the spirit and scope of the appended claims.

I claim:

1. In apparatus for feeding generally ring-shaped sealing gaskets or similar articles, a hopper having a discharge outlet, a conduit connected to the outlet, a rotary disk mounted upon a horizontal axis and operating to hold gaskets in an on-edge position for delivery to the outlet, means in part utilizing gravity for moving gaskets in succession to and through the outlet and an air injection nozzle positioned to direct air under pressure into the hopper in a generally upward direction along a surface of the disk internally of the hopper in a zone just above the outlet to thereby elevate out of contact with the gaskets in, or about to enter the outlet, those gaskets which are positioned immediately above the last named gaskets.

2. Apparatus as defined in claim 1 and venting means comprising at least one opening providing communication between the interior of the hopper and the atmosphere in proximity to the air injection nozzle.

3. Apparatus as defined in claim 1 a source of supply of air under pressure connected to the nozzle, a pressure reducing valve interposed between the nozzle and said source of supply of air under pressure and means operable to by-pass the pressure reducing valve and deliver air at full line-pressure to the nozzle.

4. In apparatus for feeding ring-shaped sealing gaskets or similar articles, a hopper having a vertical side formed to provide a horizontal discharge opening the lower half of which is of generally hemicylindrical form, a floor declined toward the lower wall of said opening and at least in part of hemicylindrical form, a lateral flange extending radially outward from the wall of at least the hemicylindrically shaped portion of said opening, a rotary disk rotatable on a horizontal axis coincident with that of the hemicylindrical part of the opening and closing the latter, said disk having an annular marginal portion in part lying outwardly of the lateral flange and together with the latter forming an arcuate guideway for gaskets of a width only slightly in excess of that of the gaskets, an arcuate wall substantially closing a major part of the outer margin of said guideway and having a portion cut way to provide a substantially horizontally disposed gasket outlet, and a conduit for gaskets communicating with said outlet, said guideway being formed to so position the gaskets that rotation of said disk rolls said gaskets in an on-edge position and in succession to and through said outlet into the conduit; the improvement which comprises an air injection nozzle for continuously directing air under pressure generally upwardly into the hopper along a surface of the disk internally of the hopper and in a zone just above said outlet whereby to relieve those gaskets entering and about to enter said conduit of downward pressure that otherwise would be applied to them by other gaskets accumulated immediately thereabove.

5. The combination defined in claim 4, a source of supply of air under pressure connected to said injection nozzle, a pressure reducing means interposed between the nozzle and source of supply of air under pressure and means including a manually operable valve by-passing the pressure reducing means whereby air under full line-pressure may be delivered to the injection nozzle at will.

References Cited in the file of this patent

UNITED STATES PATENTS

| 1,644,999 | Hardiman | Oct. 11, 1927 |
| 2,073,472 | Gantzer | Mar. 9, 1937 |
| 2,112,291 | Johnson | Mar. 29, 1938 |